(12) United States Patent
Sisson

(10) Patent No.: US 11,034,574 B1
(45) Date of Patent: Jun. 15, 2021

(54) FUEL TRANSPORT SENSOR SYSTEM

(71) Applicant: Brent Sisson, Denver, CO (US)

(72) Inventor: Brent Sisson, Denver, CO (US)

( * ) Notice: Subject to any disclaimer, the term of this patent is extended or adjusted under 35 U.S.C. 154(b) by 0 days.

(21) Appl. No.: 17/072,736

(22) Filed: Oct. 16, 2020

(51) Int. Cl.
*B67D 7/34* (2010.01)

(52) U.S. Cl.
CPC ................... *B67D 7/348* (2013.01)

(58) Field of Classification Search
CPC .......... B67D 7/34; B67D 7/344; B67D 7/346; B67D 7/348; F17C 2270/0171; F17C 2270/01
USPC ..................................... 141/94, 231
See application file for complete search history.

(56) References Cited

U.S. PATENT DOCUMENTS

| | | | |
|---|---|---|---|
| 5,586,050 A | 12/1996 | Makel et al. | |
| 6,229,448 B1 | 5/2001 | Bennett, Jr. | |
| 7,188,771 B2 * | 3/2007 | Poulter | B67D 7/346 235/375 |
| D557,157 S | 12/2007 | Sitnikov | |
| 7,938,151 B2 | 5/2011 | Hockner | |
| 8,051,882 B2 * | 11/2011 | Koeninger | B67D 7/346 141/95 |
| 8,429,095 B1 * | 4/2013 | Ryan | G06Q 50/06 705/413 |
| 8,678,050 B2 | 3/2014 | Dobson | |
| 9,499,389 B2 * | 11/2016 | Evans | B67D 7/348 |
| 9,823,665 B2 * | 11/2017 | Finnell | B67D 7/342 |
| 9,964,962 B2 * | 5/2018 | Lichtash | G05D 7/0676 |
| 9,969,604 B2 * | 5/2018 | Koeninger | B67D 7/348 |
| 10,787,358 B2 * | 9/2020 | Dudley | B67D 7/72 |
| 2019/0077292 A1 | 3/2019 | Morel-Fatio | |
| 2019/0106318 A1 | 4/2019 | Dudley | |

FOREIGN PATENT DOCUMENTS

WO   WO2019074819   4/2019

* cited by examiner

*Primary Examiner* — Timothy L Maust

(57) ABSTRACT

A fuel transport sensor system for precise loading and unloading of fuel for transports includes a transport computer configured to be coupled to a fuel transport having a plurality of fuel compartments. Each of a plurality of load head sensors is in operational communication with the transport computer and coupled to one of a plurality of load heads. A load arm sensor coupled to a load arm and the load arm sensors communicate with the transport computer to track which fuel compartment is being filled with what fuel type. A pair of hose sensors coupled to a delivery hose confirm the delivery hose is connecting the load head with the correct fuel type for an in-ground storage tank before allowing a fire valve of the load head to be opened.

8 Claims, 7 Drawing Sheets

FUEL TRANSPORT SENSOR SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to fuel transport devices and more particularly pertains to a new fuel transport device for precise loading and unloading of fuel for transports.

(2) Description of Related Art Including Information Disclosed Under 37 CFR 1.97 and 1.98

The prior art relates to fuel transport devices. Known devices are capable of detecting fluid levels and may sense identifying tags to ensure connection to correct fuel tanks. Existing devices depend on additional sensors to detect what type of fuel is being transported rather than using detection at the time of loading from the refinery.

BRIEF SUMMARY OF THE INVENTION

An embodiment of the disclosure meets the needs presented above by generally comprising a transport computer configured to be coupled to a fuel transport having a plurality of fuel compartments. Each of a plurality of load head sensors is in operational communication with the transport computer. Each load head sensor is configured to be coupled to one of a plurality of load heads of the fuel transport and in operational communication with a fire valve of the load head. A load arm sensor is in operational communication with the plurality of load head sensors and is configured to be in operational communication with a refinery computer that is in operational communication with the transport computer. The load arm sensor is configured to be coupled to a load arm of a terminal loading rack of a refinery. The load arm sensor and the load head sensor of the load head to which the load arm is attached communicate with the transport computer to track which fuel compartment is being filled with what fuel type. Each of a plurality of transmitter tags identifies a specific fuel and is configured to be coupled within a fill opening of an in-ground storage tank. A pair of hose sensors is configured to be coupled to a distal end of a delivery hose and a proximal end of the delivery hose. The hose sensor is coupled to the distal end is in operational communication with the transmitter tag and the transport computer. The hose sensor coupled to the proximal end is in operational communication with the load head sensor and the transport computer. The hose sensors confirm the delivery hose is connecting the load head with the correct fuel type for the in-ground storage tank before allowing the fire valve to be opened.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
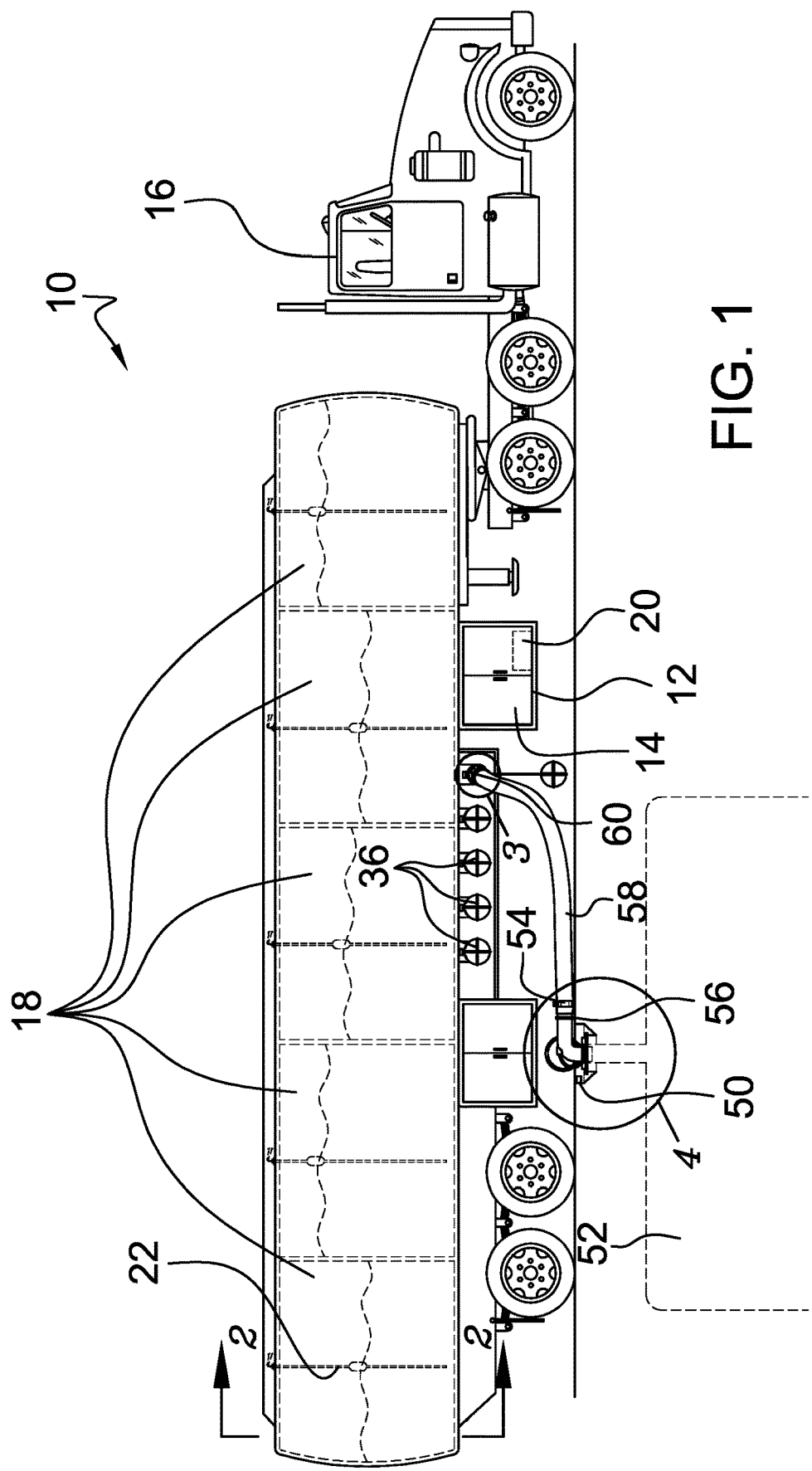
FIG. 1 is an in-use view of a fuel transport sensor system according to an embodiment of the disclosure.
Figure 2:
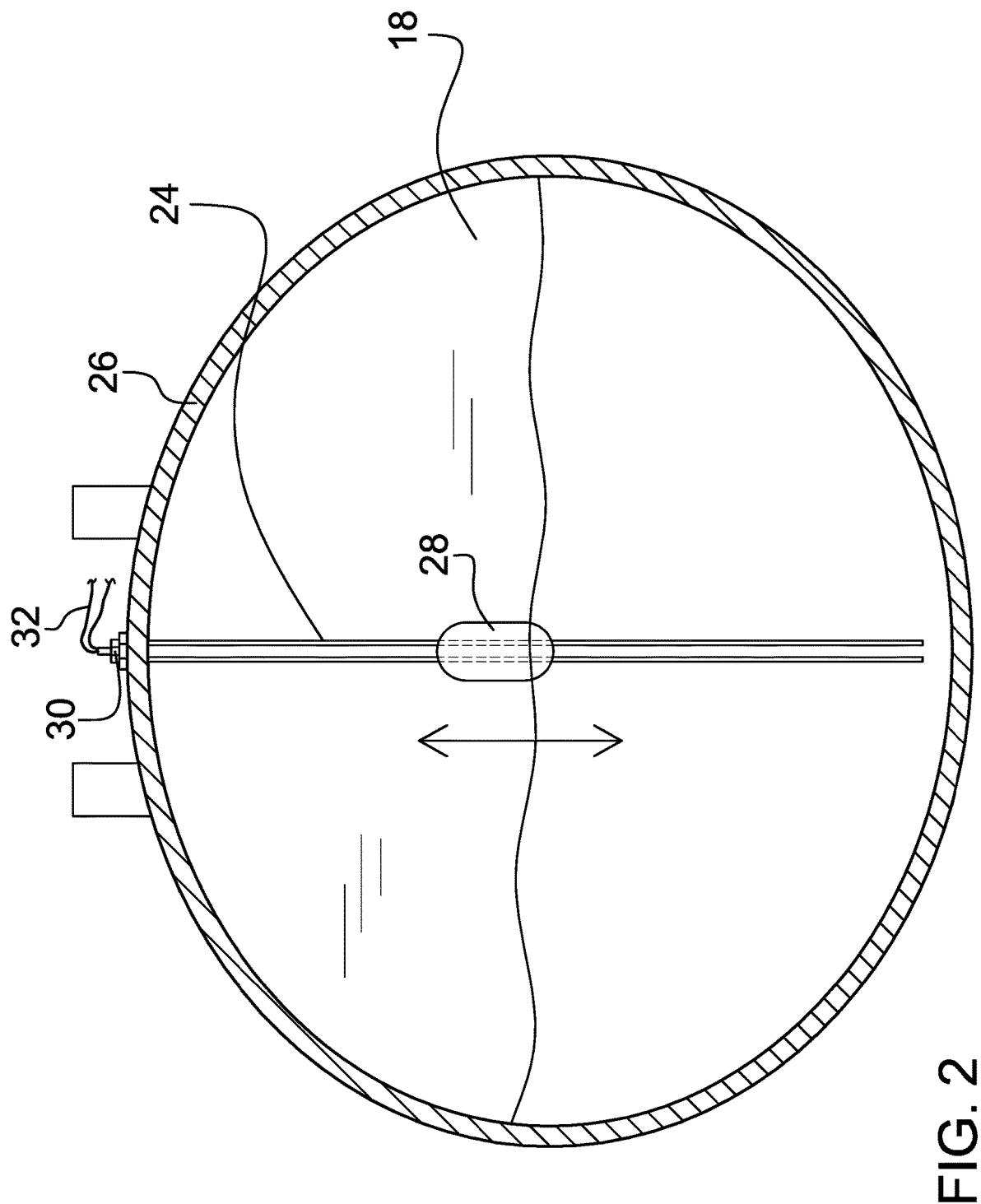
FIG. 2 is a cross-sectional view of an embodiment of the disclosure along the line 2-2 of FIG. 1.
Figure 3:
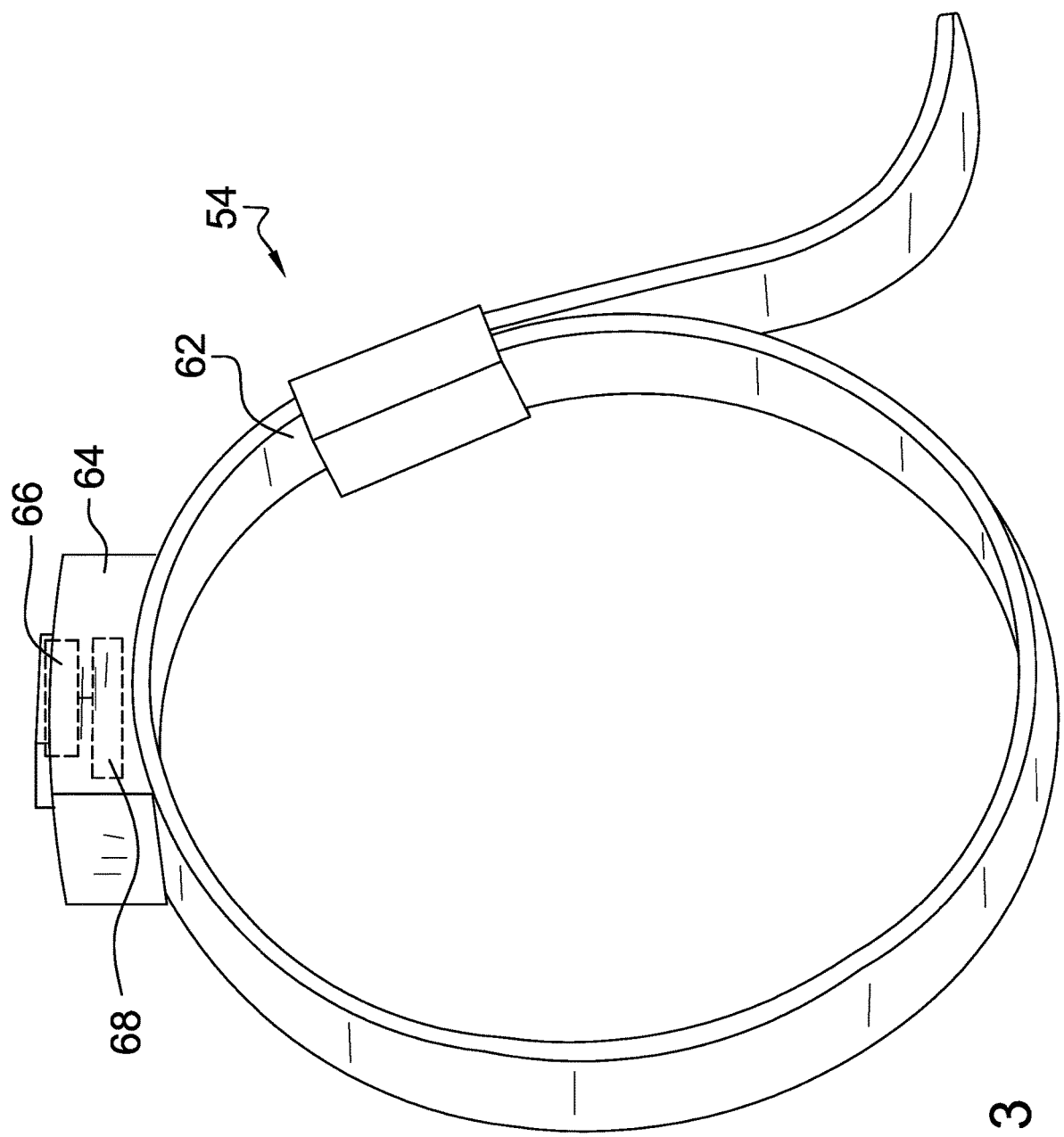
FIG. 3 is a detail isometric view of an embodiment of the disclosure.
Figure 4:
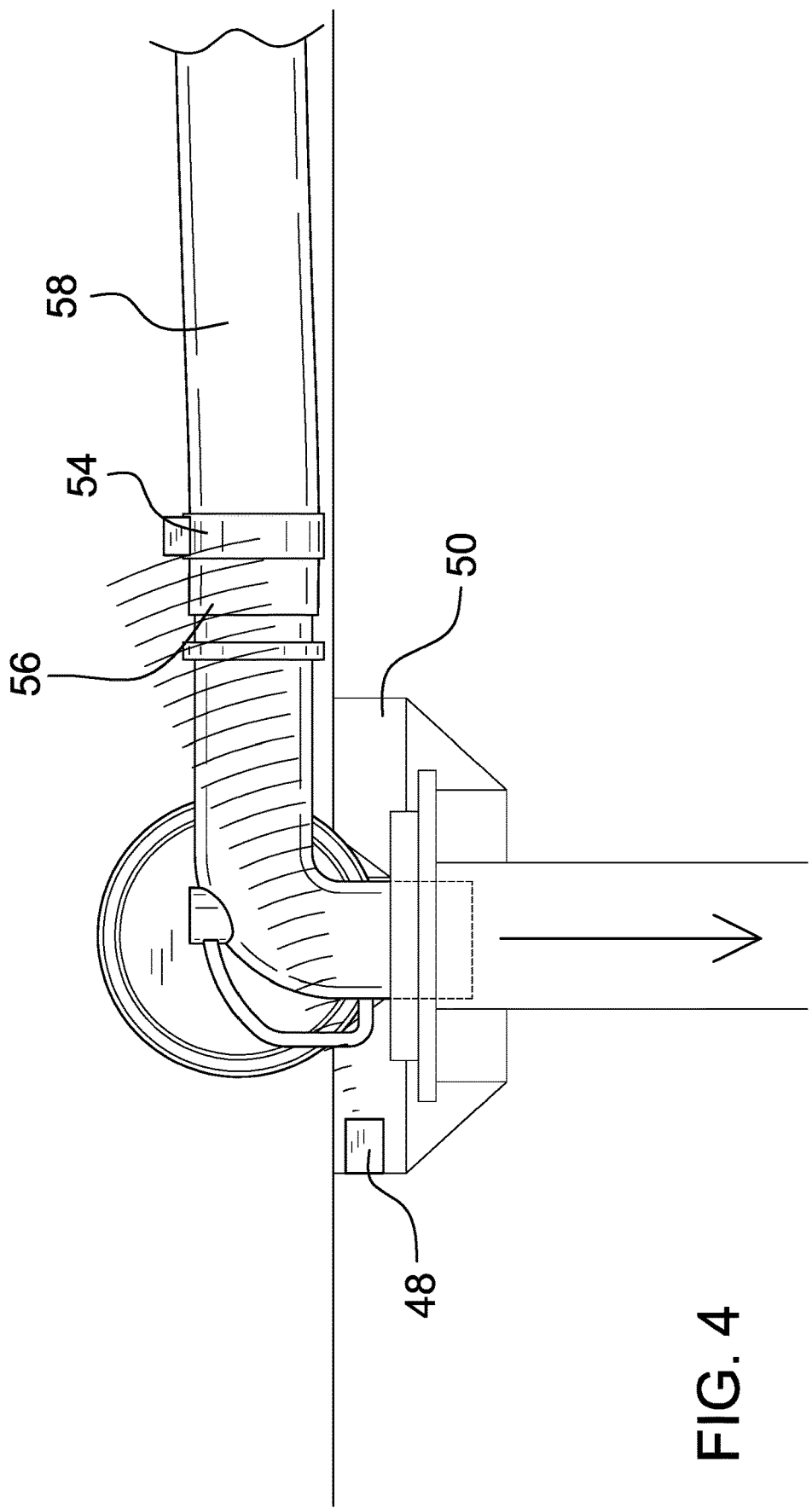
FIG. 4 is a detail in-use view of an embodiment of the disclosure.
Figure 5:
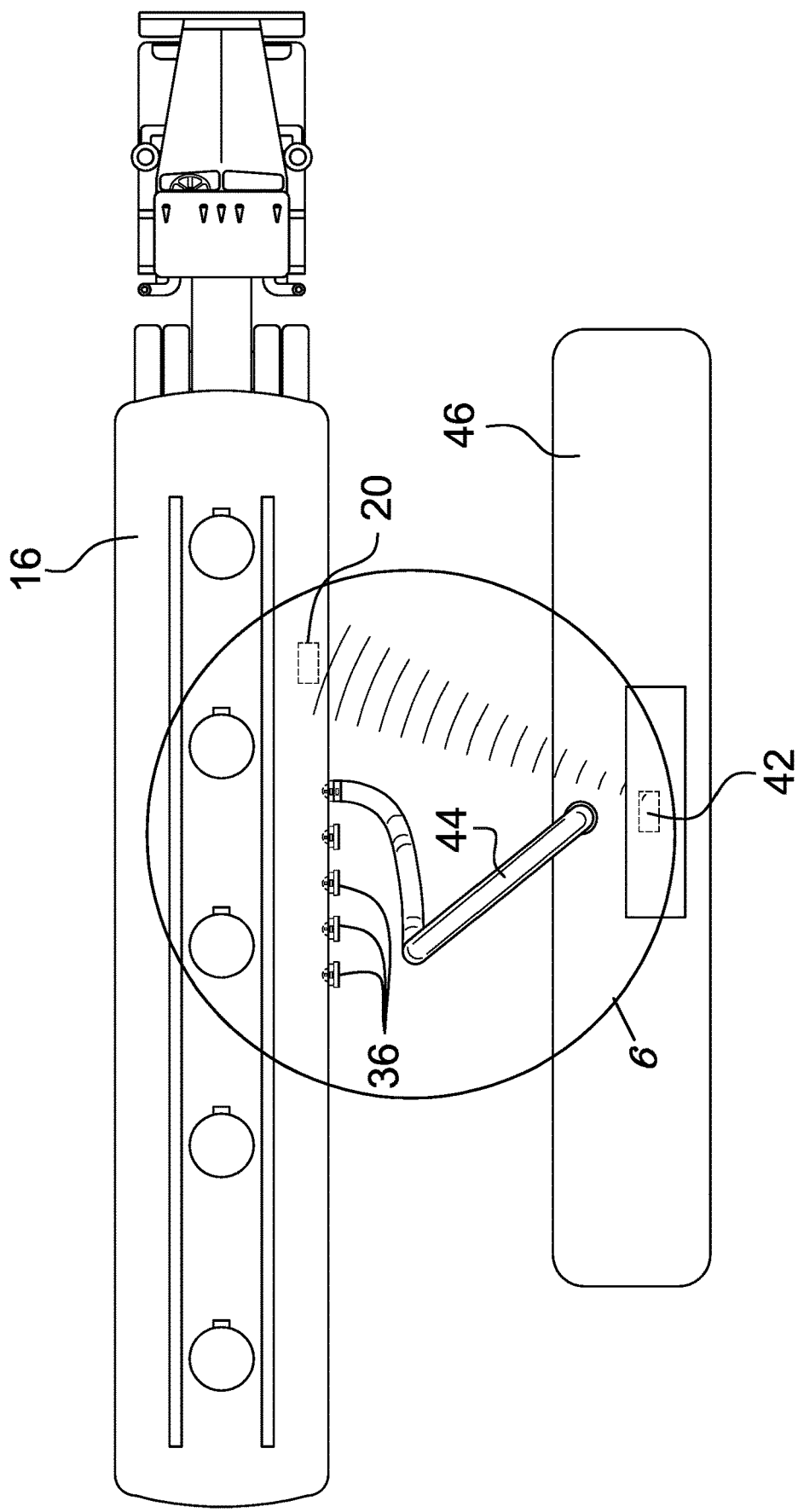
FIG. 5 is a top plan in-use view of an embodiment of the disclosure.
Figure 6:
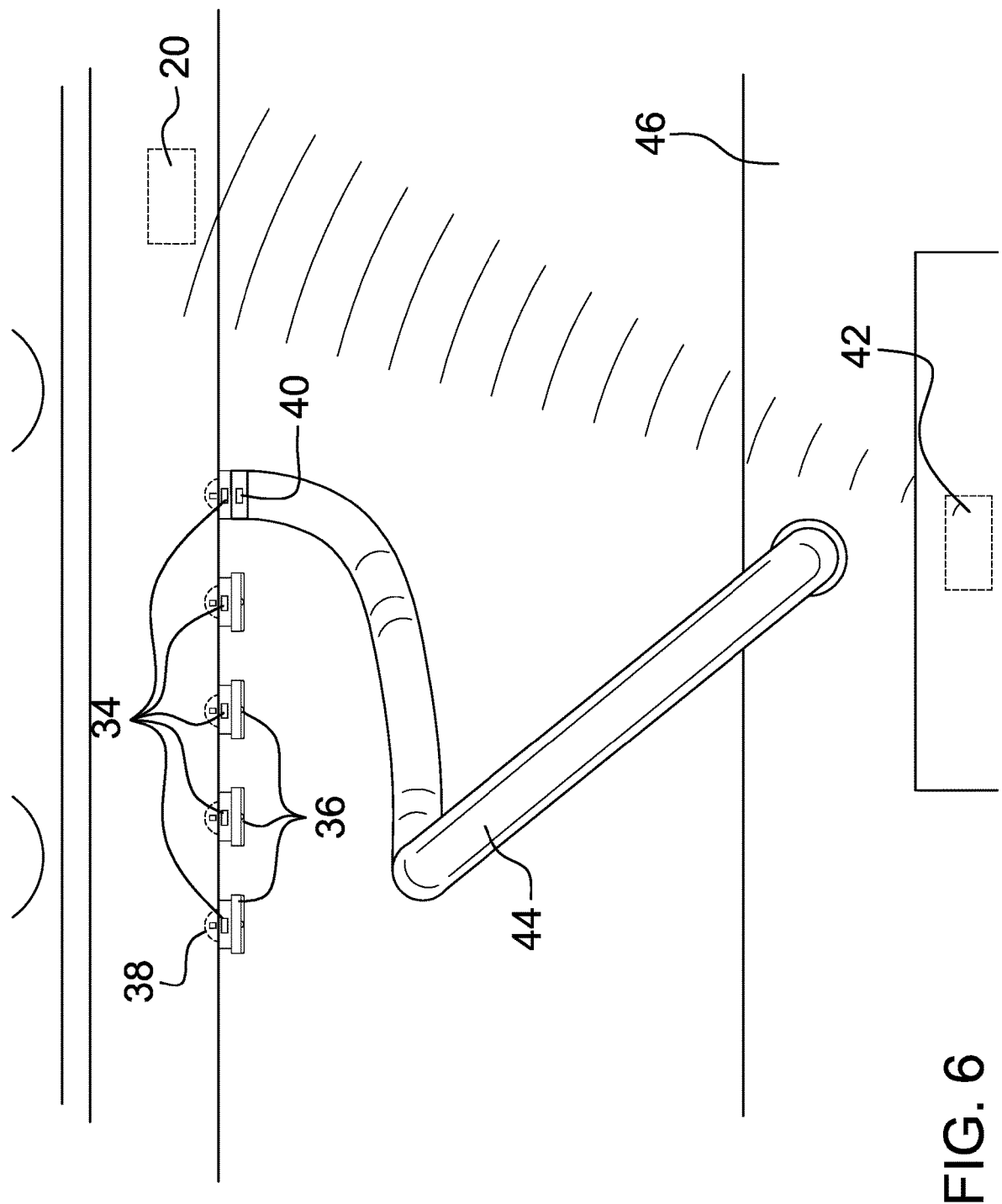
FIG. 6 is a detail in-use view of an embodiment of the disclosure.

With reference now to the drawings, and in particular to FIGS. 1 through 7 thereof, a new fuel transport device embodying the principles and concepts of an embodiment of the disclosure and generally designated by the reference numeral 10 will be described.

As best illustrated in FIGS. 1 through 7, the fuel transport sensor system 10 generally comprises a computer housing 12 have an access door 14. The computer housing 12 is configured to be coupled to a fuel transport 16 having a plurality of fuel compartments 18. A transport computer 20 is coupled within the computer housing 12.

Each of a plurality of float sensors 22 is in operational communication with the transport computer 20 and configured to be coupled within one of the fuel compartments 18. The float sensors 22 detect the fuel levels within each fuel compartment 18 to prevent overfilling. Each float sensor 22 may include a vertical float track 24 coupled to a tank wall 26 of the fuel compartment, a buoyant float portion 28 slidably coupled to the float track 24, and a wire harness 30 extending through the tank wall 26 and a pair of wires 32 extending to the transport computer 20.

Each of a plurality of load head sensors 34 is in operational communication with the transport computer 20 and is configured to be coupled to one of a plurality of load heads 36 of the fuel transport. Each load head sensors 34 has a fire valve switch 38 configured to be in operational communication with a fire valve of the load head 36.

Figure 7:
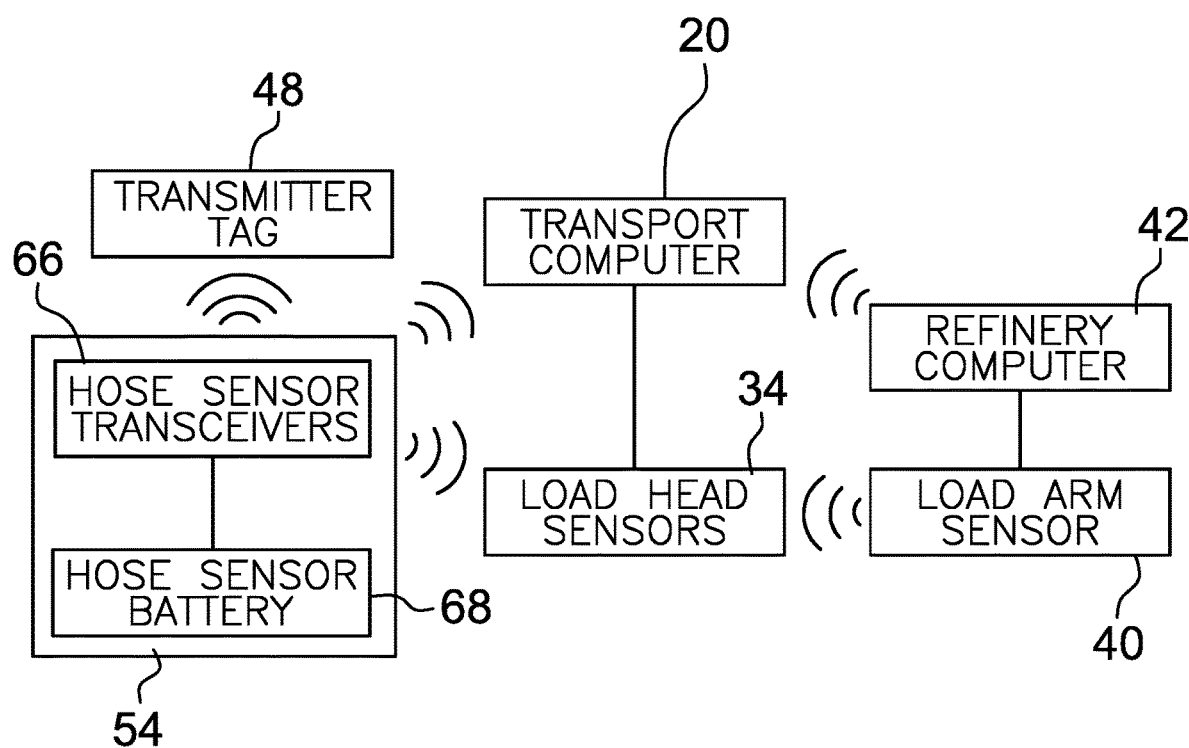
FIG. 7 is a block diagram of an embodiment of the disclosure.

A load arm sensor 40 is in operational communication with the plurality of load head sensors 34 and is configured to be in operational communication with a refinery computer 42 that is in operational communication with the transport computer 20. The load arm sensor 40 is configured to be coupled to a load arm 44 of a terminal loading rack 46 of a refinery. The fuel capacity as determined by the float sensors 22 and the transport computer 20 is communicated to the refinery computer 42, either hardwired or wirelessly as represented in FIG. 7, to determine if the amount of the given fuel type can fit into the respective fuel compartment 18 the load arm 44 is attached in order to prevent spillage.

Each of a plurality of transmitter tags 48 identifies a specific fuel and is configured to be coupled within a fill opening 50 of an in-ground storage tank 52. A pair of hose sensors 54 is configured to be coupled to a distal end 56 of a delivery hose 58 and a proximal end 60 of the delivery hose. Each hose sensor 54 may have a hose clamp 62, a hose sensor housing 64 coupled to the hose clamp 62, a wireless hose sensor transceiver 66 coupled within the hose sensor housing 64, and a hose sensor battery 68 coupled within the hose sensor housing 64 and being in operational communication with the hose sensor transceiver 66. The hose sensor housing 64 may be waterproof and fireproof. The hose sensor 54 coupled to the distal end 56 is in operational communication with the transmitter tag 48 and the transport computer 20. The hose sensor 54 coupled to the proximal end 60 is in operational communication with the load head sensor 34 and the transport computer 20. The hose sensor transceiver 66 may be directional so as to only interact with the load head sensor 34 of the load head 36 to which the proximal end 60 is attached.

In use, the load arm sensor 40 and the load head sensor 34 of the load head 36 to which the load arm 44 is attached communicates with the transport computer 20 to track which fuel compartment 18 is being filled with what fuel type. The plurality of float sensors 22 prevent overfilling. The hose sensors 54 confirm the delivery hose 58 is connecting the load head 36 of the fuel compartment 18 with the correct fuel type for the in-ground storage tank 52 before allowing the fire valve to be opened by the fire valve switch 38.

With respect to the above description, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A fuel transport sensor system comprising:
   a transport computer, the transport computer being configured to be coupled to a fuel transport having a plurality of fuel compartments;
   a plurality of load head sensors, each load head sensor being in operational communication with the transport computer and being configured to be coupled to one of a plurality of load heads of the fuel transport and in operational communication with a fire valve of the load head;
   a load arm sensor, the load arm sensor being in operational communication with the plurality of load head sensors and configured to be in operational communication with a refinery computer that is in operational communication with the transport computer, the load arm sensor being configured to be coupled to a load arm of a terminal loading rack of a refinery, the load arm sensor and the load head sensor of the load head to which the load arm is attached communicating with the transport computer to track which fuel compartment is being filled with what fuel type;
   a plurality of transmitter tags, each transmitter tag identifying a specific fuel and being configured to be coupled within a fill opening of an in-ground storage tank; and
   a pair of hose sensors configured to be coupled to a distal end of a delivery hose and a proximal end of the delivery hose, the hose sensor coupled to the distal end being in operational communication with the transmitter tag and the transport computer, the hose sensor coupled to the proximal end being in operational communication with the load head sensor and the transport computer, the hose sensors confirming the delivery hose is connecting the load head with the correct fuel type for the in-ground storage tank before allowing the fire valve to be opened.

2. The fuel transport sensor system of claim 1 further comprising a plurality of float sensors, each float sensor being in operational communication with the transport computer and configured to be coupled within one of the fuel compartments, the float sensors detecting the fuel levels within each fuel compartment to prevent overfilling.

3. The fuel transport sensor system of claim 2 further comprising each float sensor including a vertical float track coupled to a tank wall of the fuel compartment and a float portion slidably coupled to the float track, the float portion being buoyant.

4. The fuel transport sensor system of claim 3 further comprising each float sensor having a wire harness extending through the tank wall and a pair of wires extending to the transport computer.

5. The fuel transport sensor system of claim 1 further comprising a computer housing, the computer housing have an access door, the computer housing being configured to be coupled to the fuel transport, the transport computer being coupled within the computer housing.

6. The fuel transport sensor system of claim 1 further comprising each hose sensor having a hose clamp, a hose sensor housing coupled to the hose clamp, a wireless hose sensor transceiver coupled within the wireless hose sensor housing, and a hose sensor battery coupled within the hose sensor housing and being in operational communication with the hose sensor transceiver.

7. A fuel transport sensor system comprising:
   a computer housing, the computer housing have an access door, the computer housing being configured to be coupled to a fuel transport having a plurality of fuel compartments;
   a transport computer coupled within the computer housing;
   a plurality of float sensors, each float sensor being in operational communication with the transport computer and configured to be coupled within one of the fuel compartments, the float sensors detecting the fuel levels within each fuel compartment to prevent overfilling, each float sensor including a vertical float track coupled to a tank wall of the fuel compartment, a buoyant float portion slidably coupled to the float track, and a wire harness extending through the tank wall and a pair of wires extending to the transport computer;
   a plurality of load head sensors, each load head sensor being in operational communication with the transport computer and being configured to be coupled to one of a plurality of load heads of the fuel transport and in operational communication with a fire valve of the load head;
   a load arm sensor, the load arm sensor being in operational communication with the plurality of load head sensors and configured to be in operational communication with a refinery computer that is in operational communication with the transport computer, the load arm sensor being configured to be coupled to a load arm of a terminal loading rack of a refinery, the load arm sensor and the load head sensor of the load head to which the load arm is attached communicating with the transport computer to track which fuel compartment is being filled with what fuel type;
   a plurality of transmitter tags, each transmitter tag identifying a specific fuel and being configured to be coupled within a fill opening of an in-ground storage tank; and
   a pair of hose sensors configured to be coupled to a distal end of a delivery hose and a proximal end of the delivery hose, each hose sensor having a hose clamp, a hose sensor housing coupled to the hose clamp, a wireless hose sensor transceiver coupled within the hose sensor housing, and a hose sensor battery coupled within the hose sensor housing and being in operational communication with the hose sensor transceiver, the wireless hose sensor coupled to the distal end being in operational communication with the transmitter tag and the transport computer, the hose sensor coupled to the proximal end being in operational communication with the load head sensor and the transport computer, the hose sensors confirming the delivery hose is connecting the load head with the correct fuel type for the in-ground storage tank before allowing the fire valve to be opened.

8. A fuel transport and fuel transport sensor system comprising:
   a fuel transport having a plurality of fuel compartments;
   a computer housing, the computer housing have an access door, the computer housing being configured to be coupled to the fuel transport;
   a transport computer coupled within the computer housing;
   a plurality of float sensors, each float sensor being in operational communication with the transport computer and coupled within one of the fuel compartments, the float sensors detecting the fuel levels within each fuel compartment to prevent overfilling, each float sensor including a vertical float track coupled to a tank wall of the fuel compartment, a buoyant float portion slidably coupled to the float track, and a wire harness extending through the tank wall and a pair of wires extending to the transport computer;
   a plurality of load head sensors, each load head sensor being coupled to one of a plurality of load heads of the fuel transport and in operational communication with a fire valve of the load head and the transport computer;
   a load arm sensor, the load arm sensor being in operational communication with the plurality of load head sensors and configured to be in operational communication with a refinery computer that is in operational communication with the transport computer, the load arm sensor being configured to be coupled to a load arm of a terminal loading rack of a refinery, the load arm sensor and the load head sensor of the load head to which the load arm is attached communicating with the transport computer to track which fuel compartment is being filled with what fuel type;
   a plurality of transmitter tags, each transmitter tag identifying a specific fuel and being configured to be coupled within a fill opening of an in-ground storage tank; and
   a pair of hose sensors coupled to a distal end of a delivery hose and a proximal end of the delivery hose, each hose sensor having a hose clamp, a hose sensor housing coupled to the hose clamp, a wireless hose sensor transceiver coupled within the hose sensor housing, and a hose sensor battery coupled within the hose sensor housing and being in operational communication with the hose sensor transceiver, the wireless hose sensor coupled to the distal end being in operational communication with the transmitter tag and the transport computer, the hose sensor coupled to the proximal end being in operational communication with the load head sensor and the transport computer, the hose sensors confirming the delivery hose is connecting the load head with the correct fuel type for the in-ground storage tank before allowing the fire valve to be opened.

\* \* \* \* \*